(12) United States Patent
Ryu et al.

(10) Patent No.: US 12,049,240 B2
(45) Date of Patent: Jul. 30, 2024

(54) METHOD AND APPARATUS FOR CONTROLLING AUTOMATED GUIDED VEHICLE

(71) Applicant: SAMSUNG SDS CO., LTD., Seoul (KR)

(72) Inventors: Ho Sang Ryu, Seoul (KR); Kyoung Il Han, Seoul (KR); Jin Kyung Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 266 days.

(21) Appl. No.: 17/370,540

(22) Filed: Jul. 8, 2021

(65) Prior Publication Data
US 2022/0135083 A1 May 5, 2022

(30) Foreign Application Priority Data
Oct. 30, 2020 (KR) .................... 10-2020-0143001

(51) Int. Cl.
*B60W 60/00* (2020.01)
*B65G 1/04* (2006.01)
*B65G 1/137* (2006.01)
*G05D 1/00* (2024.01)

(52) U.S. Cl.
CPC ..... *B60W 60/00256* (2020.02); *B65G 1/0492* (2013.01); *B65G 1/137* (2013.01); *G05D 1/0212* (2013.01); *B60W 2556/45* (2020.02); *B60W 2754/00* (2020.02)

(58) Field of Classification Search
CPC ..................... G05D 1/0212; G05D 1/0274
See application file for complete search history.

(56) References Cited

U.S. PATENT DOCUMENTS

| 5,897,595 A | 4/1999 | Hawkins et al. |
| 2014/0236413 A1* | 8/2014 | D'Andrea ............ G05D 1/0297 701/25 |
| 2016/0272436 A1* | 9/2016 | Seibold .................. B65G 43/10 |

(Continued)

FOREIGN PATENT DOCUMENTS

| KR | 10-1981028 A | 5/2019 |
| KR | 10-2123790 B1 | 6/2020 |

OTHER PUBLICATIONS

Xiaobu Yuan, Multi-Robot Coordination with Balanced Task Allocation and Optimized Path Planning, 2007 (Year: 2007).*

(Continued)

*Primary Examiner* — Christian Chace
*Assistant Examiner* — Shayne M. Gilbertson
(74) *Attorney, Agent, or Firm* — Sughrue Mion, PLLC

(57) ABSTRACT

A method performed by a computing device for controlling an automated guided vehicle according to an embodiment of the present disclosure includes obtaining information on a movable area including nodes arranged in a grid pattern, obtaining information on a moving path connecting a source node and a destination node existing in the movable area, wherein the moving path includes a plurality of moving nodes, and reserving at least some of the moving nodes located between a current node and the destination node by using information on the current node occupied by an automated guided vehicle according to movement of the automated guided vehicle.

13 Claims, 14 Drawing Sheets

(56) References Cited

U.S. PATENT DOCUMENTS

2018/0299882 A1    10/2018  Kichkaylo
2020/0097022 A1*    3/2020  Miki ................... G05D 1/0291

OTHER PUBLICATIONS

Yunfeng Fan, Multi-robot Task Allocation and Path Planning System Design, 2020 (Year: 2020).*
Biao Hu, Multi-Robot Path Planning for Each Robot with Several Jobs in a Single Trip, 2020 (Year: 2020).*
European Search Report For EP 21184672.0 issued on Dec. 16, 2021 from European patent office in a counterpart European patent application.
Communication issued on Oct. 17, 2023 by European Patent Office in corresponding European Application No. 21184672.0.
Office Action issued Nov. 10, 2023 by Korean Patent Office in corresponding Korean Patent Application No. 10-2023-0037923.

* cited by examiner (a)

(b)

METHOD AND APPARATUS FOR CONTROLLING AUTOMATED GUIDED VEHICLE

This application claims the benefit of Korean Patent Application No. 10-2020-0143001, filed on Oct. 30, 2020, in the Korean Intellectual Property Office, the disclosure of which is incorporated herein by reference in its entirety.

BACKGROUND

1. Field

The present disclosure relates to a method for controlling an automated guided vehicle (AGV). More specifically, it relates to a method and apparatus for reserving a moving node constituting a moving path in order to prevent collision of a plurality of automated guided vehicles capable of dynamically determining a moving path in a movable area. In addition, the present disclosure relates to a method and apparatus for efficiently storing materials loaded in an automated guided vehicle by using an automated guided vehicle, to which an automated guided vehicle control method is applied.

2. Description of the Related Art

An automated guided vehicle is a device that transports objects, that is goods, and is being commercialized in distribution centers, hospitals, airports and marts. The automated guided vehicle is replacing the object transport work previously performed by human workers. Hereinafter, a conventional method of controlling an automated guided vehicle will be described with reference to FIG. 4.

In the prior art of controlling the automated guided vehicle, the automated guided vehicle moves only a predetermined path. Referring to FIG. 4, the first automated guided vehicle 3 moves only a first predetermined path 1, and the second automated guided vehicle 4 also moves only a predetermined second path 2. The first automated guided vehicle 3 and the second automated guided vehicle 4 move only a predetermined path, so that there is no risk of collision between the automated guided vehicles except for the collision possible area 5. Therefore, in order to solve the collision problem in the collision possible area 5 that may occur, by providing the first identifier 6 on the first path 1, and the second identifier 7 on the second path 2, the automated guided vehicle that first reaches and identifies the identifier is controlled to first enter and exit the collision possible area 5.

However, in the case of an automated guided vehicle that can dynamically determine a moving path in a movable area, since all points in the movable area can be a collision possible area, a technology that can prevent collision between the automated guided vehicle is required.

In addition, the prior art for managing materials using an automated guided vehicle has a problem that a specific criterion for storing materials is insufficient when the storage amount of a storage area for storing materials is exceeded.

SUMMARY

The technical problem to be solved by some embodiments of the present disclosure is to provide a method and an apparatus for determining a moving path in a movable area.

Another technical problem to be solved by some embodiments of the present disclosure is to provide a method and apparatus for preventing collision of an automated guided vehicle that dynamically determines a moving path in a movable area.

Another technical problem to be solved by some embodiments of the present disclosure is to provide a method and apparatus for transporting an object loaded in an automated guided vehicle more safely.

Another technical problem to be solved by some embodiments of the present disclosure is to provide a method and apparatus for identifying a current position of an automated guided vehicle in a movable area.

Another technical problem to be solved by some embodiments of the present disclosure is to provide a method and apparatus for enabling an important automated guided vehicle to move faster than other automated guided vehicles.

Another technical problem to be solved by some embodiments of the present disclosure is to provide a method and an apparatus for determining the reservation priority of moving nodes.

Another technical problem to be solved by some embodiments of the present disclosure is to provide a method and an apparatus for determining an alternative storage area when the storage amount of the storage area is exceeded.

Another technical problem to be solved by some embodiments of the present disclosure is to provide a method and apparatus for managing objects more effectively using an automated guided vehicle.

The technical problems of the present disclosure are not limited to the technical problems mentioned above, and other technical problems that are not mentioned will be clearly understood by those skilled in the art from the following description.

According to a method performed by a computing device for controlling an automated guided vehicle comprising, obtaining information on a movable area including nodes arranged in a grid pattern, obtaining information on a moving path connecting a source node and a destination node existing in the movable area, wherein the moving path includes a plurality of moving nodes and reserving at least some of the moving nodes located between a current node and the destination node by using information on the current node occupied by an automated guided vehicle according to movement of the automated guided vehicle.

According to an embodiment, further comprises, transmitting a signal for moving the automated guided vehicle to the automated guided vehicle to sequentially visit the reserved moving nodes.

According to an embodiment, wherein obtaining information on the moving path comprises, searching for a first moving path from a first source node of a first automated guided vehicle to the destination node, searching for a second moving path from a second source node of a second automated guided vehicle to the destination node and determining a moving path including a smaller number of moving nodes among the first moving path and the second moving path as a shortest moving path.

According to an embodiment, transmitting a signal for moving a shortest path automated guided vehicle that occupies a moving path determined as the shortest moving path to the shortest path automated guided vehicle so that the shortest path automated guided vehicle moves along the shortest moving path.

According to an embodiment, wherein determining a moving path including a smaller number of moving nodes among the first moving path and the second moving path as the shortest moving path comprises, determining a moving path occupied by an automated guided vehicle in moving as the shortest moving path when the number of moving nodes included in the first moving path and the number of moving nodes included in the second moving path are the same.

According to an embodiment, wherein determining a moving path including a smaller number of moving nodes among the first moving path and the second moving path as the shortest moving path comprises, determining a moving path occupied by an automated guided vehicle not loaded with an object as the shortest moving path when the number of moving nodes included in the first moving path and the number of moving nodes included in the second moving path are the same.

According to an embodiment, wherein reserving at least some of the moving nodes comprises, identifying an identifier displayed on the current node to obtain information on the current node.

According to an embodiment, wherein reserving at least some of the moving nodes comprises, reserving a reference number of moving nodes based on the current node.

According to an embodiment, wherein reserving the reference number of moving nodes based on the current node comprises, assigning a weight based on an importance of the automated guided vehicle, wherein the weight increases the reference number as the importance increases.

According to an embodiment, wherein reserving the reference number of moving nodes based on the current node comprises, reserving, if a single path without a detour path is included on the moving path, all moving nodes included in the single path.

According to an embodiment, wherein reserving at least some of the moving nodes comprises, reserving at least some of moving nodes included on a first moving path with priority over a second moving path, wherein the first moving path is occupied by a first automated guided vehicle moving straight and the second moving path is occupied by a second automated guided vehicle moving in rotation.

According to an embodiment, wherein reserving at least some of the moving nodes comprises, reserving at least some of moving nodes included on a first moving path with priority over a second moving path, wherein the first moving path is occupied by a first automated guided vehicle not loaded with an object and the second moving path occupied by a second automated guided vehicle loaded with an object.

According to an embodiment, wherein reserving at least some of the moving nodes comprises, reserving at least some of moving nodes included on a first moving path with priority over a second moving path, wherein the first moving path is occupied by a first automated guided vehicle having a relatively longer waiting time and the second moving path is occupied by a second automated guided vehicle having a relatively shorter waiting time.

According to a method performed by a computing device for managing an object comprising, obtaining information on a plurality of storage areas partitioned according to attribute information of an object, obtaining attribute information of a transport object loaded in an automated guided vehicle to transport the transport object loaded in the automated guided vehicle to any one of the plurality of storage areas and transmitting a first signal to the automated guided vehicle so that the transport object is transported to a target storage area matching the attribute information, wherein transmitting the first signal comprises, transmitting, when a storage amount of the target storage area is exceeded, a second signal to the automated guided vehicle so that the transport object is transported to an alternative storage area determined by an alternative criterion.

According to an embodiment, wherein the attribute information of the object is information including information on a type of the object and information on a state of the object.

According to an embodiment, wherein the alternative criterion is a criterion for determining a nearest storage area of the target storage area as the alternative storage area.

According to an embodiment, wherein the alternative criterion is a criterion for determining a storage area having a smallest storage rate among the plurality of storage areas as the alternative storage area.

According to an embodiment, wherein the alternative criterion determines an alternative storage area according to a predetermined order, and if a storage rate of a best alternative storage area is equal to or greater than a reference value, repeatedly determines a next alternative storage area by considering a storage rate of the next alternative storage area according to the predetermined order until the storage rate of the next alternative storage area is less than the reference value.

According to an embodiment, wherein the alternative criterion is a criterion for determining a storage area storing a similar object determined based on a degree of similarity with the attribute information of the transport object as the alternative storage area.

According to another aspect of present disclosure, an automated guided vehicle comprising, a processor, a network interface, a memory and a computer program loaded into the memory and executed by the processor, wherein the computer program comprises, an instruction for obtaining information on a movable area including nodes arranged in a grid pattern, an instruction for obtaining information on a moving path connecting a source node and a destination node existing in the movable area, wherein the moving path includes a plurality of moving nodes and an instruction for reserving at least some of the moving nodes located between a current node and the destination node by using information on the current node occupied by an automated guided vehicle according to movement of the automated guided vehicle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
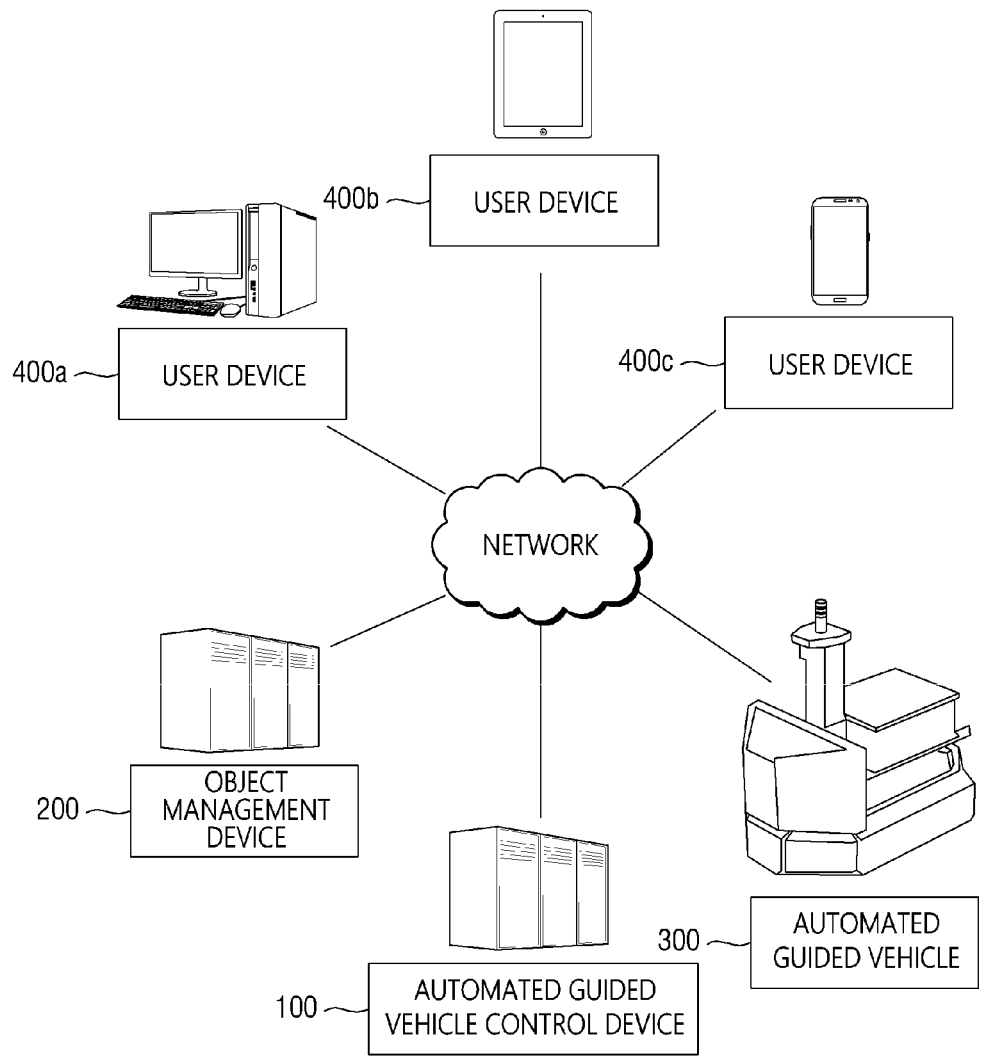
FIG. 1 is a view for describing an automated guided vehicle control system according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

FIG. 1 is a block diagram of an automated guided vehicle control system according to an embodiment of the present disclosure.

Each of the elements of the automated guided vehicle control system disclosed in FIG. 1 represents functional elements that are functionally divided, and any one or more elements may be integrated and implemented with each other in an actual physical environment.

Referring to FIG. 1, an automated guided vehicle control system according to an embodiment of the present disclosure may include an automated guided vehicle control device 100, an object management device 200, an automated guided vehicle 300, and a user device 400a, 400b, 400c (hereinafter, for convenience of description, 400).

Hereinafter, each component will be described in detail.

The automated guided vehicle control device 100 may control the automated guided vehicle 300. More specifically, the automated guided vehicle control device 100 may reserve a moving node constituting the moving path of the automated guided vehicle 300 in order to prevent collisions between a plurality of automated guided vehicles moving in the movable area.

Figure 5:
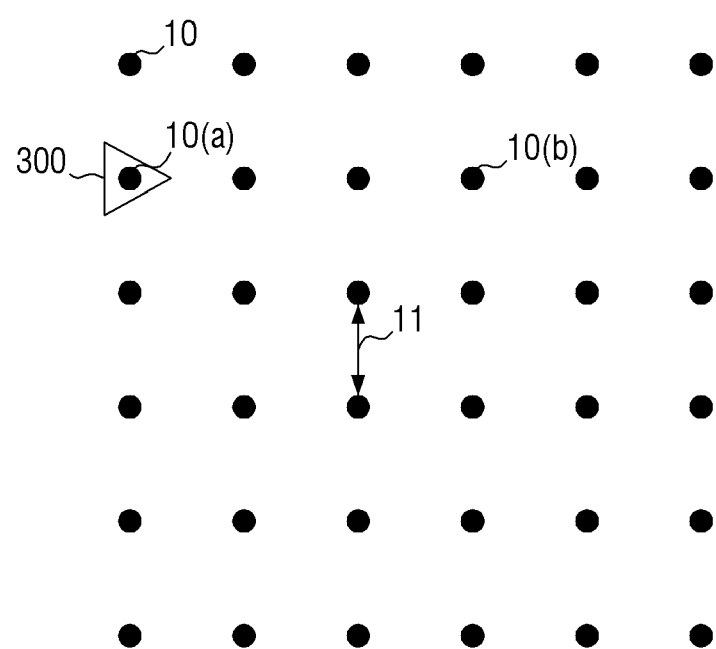
FIG. 5 is a view for describing a movable area that can be referred to in some embodiments.

For a detailed description of this, it will be described below with reference to FIGS. 5 and 6. FIG. 5 is a view for describing a movable area that can be referred to in some embodiments.

Referring to FIG. 5, the movable area may include nodes 10 arranged in a grid pattern. Here, the node 10 may be displayed with an identifier. In this case, different identifiers may be displayed for each node 10 to identify the current position of the automated guided vehicle 300. A specific method of controlling the automated guided vehicle 300 based on the current position of the automated guided vehicle 300 will be embodied through later descriptions of the specification.

Figure 4:
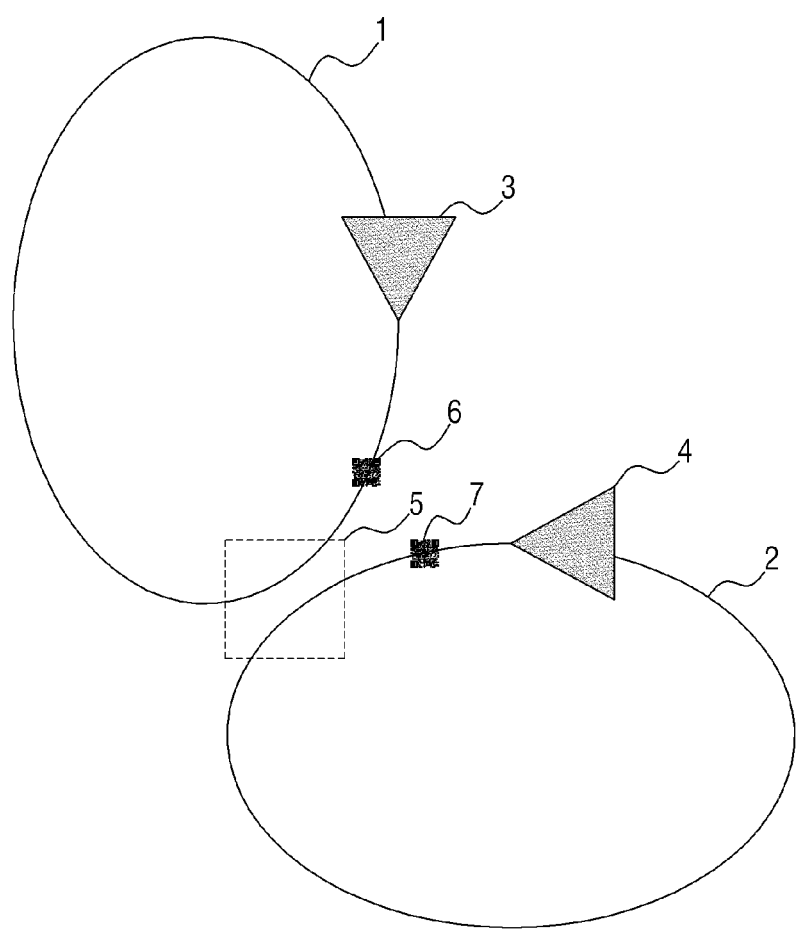
FIG. 4 is a view for describing the prior art related to the control of the automated guided vehicle.

Unlike the conventional automated guided vehicle control technology described with reference to FIG. 4 above, the automated guided vehicle 300 can freely move on the node 10 arranged in the movable area. For example, the automated guided vehicle 300 may depart from the source node 10(*a*) and move to the destination node 10(*b*). The source node 10(*a*) and the destination node 10(*b*) illustrated in this drawing are only examples for describing the free movement of the automated guided vehicle 300 in the movable area, and the present disclosure is not limited to this example.

Referring to FIG. 5, the distance 11 between nodes in the movable area requires a distance that does not cause interference between different automated guided vehicles located in adjacent nodes. Since the distance 11 between nodes is determined as a distance, at which interference does not occur between different automated guided vehicles, collision between automated guided vehicles located at different nodes 10 may not occur. Each of the automated guided vehicles located at different nodes 10 can perform a designated task without collision.

Figure 6:
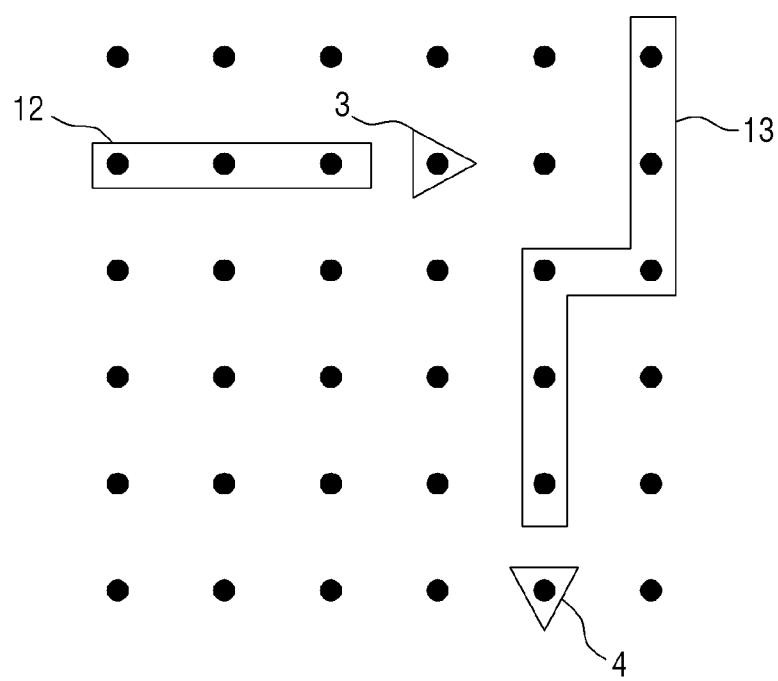
FIG. 6 is a view for describing movement of a plurality of automated guided vehicles in a movable area that may be referred to in some embodiments.

FIG. 6 is a diagram for describing movement of a plurality of automated guided vehicles in a movable area that may be referred to in some embodiments.

Referring to FIG. 6, a state, in which the first automated guided vehicle 3 and the second automated guided vehicle 4 move freely in the movable area, is shown. The first automated guided vehicle 3 moves along the first moving path 12, and the second automated guided vehicle 4 moves along the second moving path 13.

Unlike the conventional automated guided vehicle control technology described with reference to FIG. 4 above, since the first automated guided vehicle 3 and the second automated guided vehicle 4 can freely move on a node arranged in the movable area, there is no risk of collision between the automated guided vehicles, except in the case where the first automated guided vehicle 3 and the second automated guided vehicle 4 are located at the same node. A method that can prevent collisions between automated guided vehicles by not locating different automated guided vehicles at the same node will be embodied through the later descriptions of the specification.

The automated guided vehicles shown in FIG. 6 are limited to two of the first automated guided vehicle 3 and the second automated guided vehicle 4, but does not limit the number of automated guided vehicles that move in the movable area, and a plurality of automated guided vehicles may move in the movable area. It will be described again with reference to FIG. 1.

The automated guided vehicle control device 100 may be included in the automated guided vehicle 300 to be described later. More specific operations related to the automated guided vehicle control device 100 will be embodied through later descriptions of the specification.

Next, the object management device 200 may manage objects loaded in the automated guided vehicle 300. More specifically, it may be determined that to which of the plurality of storage areas partitioned according to the attribute information of the object the object loaded in the automated guided vehicle 300 should be transported.

Here, the object may mean all objects that can be loaded in the automated guided vehicle 300. For example, materials may be loaded in the automated guided vehicle 300. For another example, a shelf, in which materials are stored, may be loaded in the automated guided vehicle 300.

In addition, the attribute information of the object may mean information on the type of the object. For example, 'a part' and 'b part' have different types of objects, so attribute information of the object may be different. In this case, 'a part' may be stored in 'a area,' and 'b part' may be stored in 'b area.'

Also, the attribute information of the object may mean information on the state of the object. For example, information on the state of an object may mean a result of classifying the object. For a more specific example, information on the state of the object may be classified into 'normal,' 'repair' and 'destruction.' In this case, normal products may be stored in 'normal area,' products requiring repair may be stored in 'repair area,' and products to be destroyed may be stored in 'destruction area.' For another example, the information on the state of the object may refer to a process step of the object. For a more specific example, information about the state of the object may be classified into 'receipt,' 'a process,' and 'b process.' In this case, the received parts may be stored in the 'receipt area,' the parts scheduled for 'a process' may be stored in the 'a process area,' and the parts scheduled for 'b process' may be stored in the 'b process area.'

In addition, as for the attribute information of the object, the type of the object and the state of the object may be considered together. The present disclosure is not limited to the examples described in relation to the attribute information of the object, and all the information that can represent the attribute of the object and serve as a storage criterion may be included in the attribute information of the object.

Figure 11:
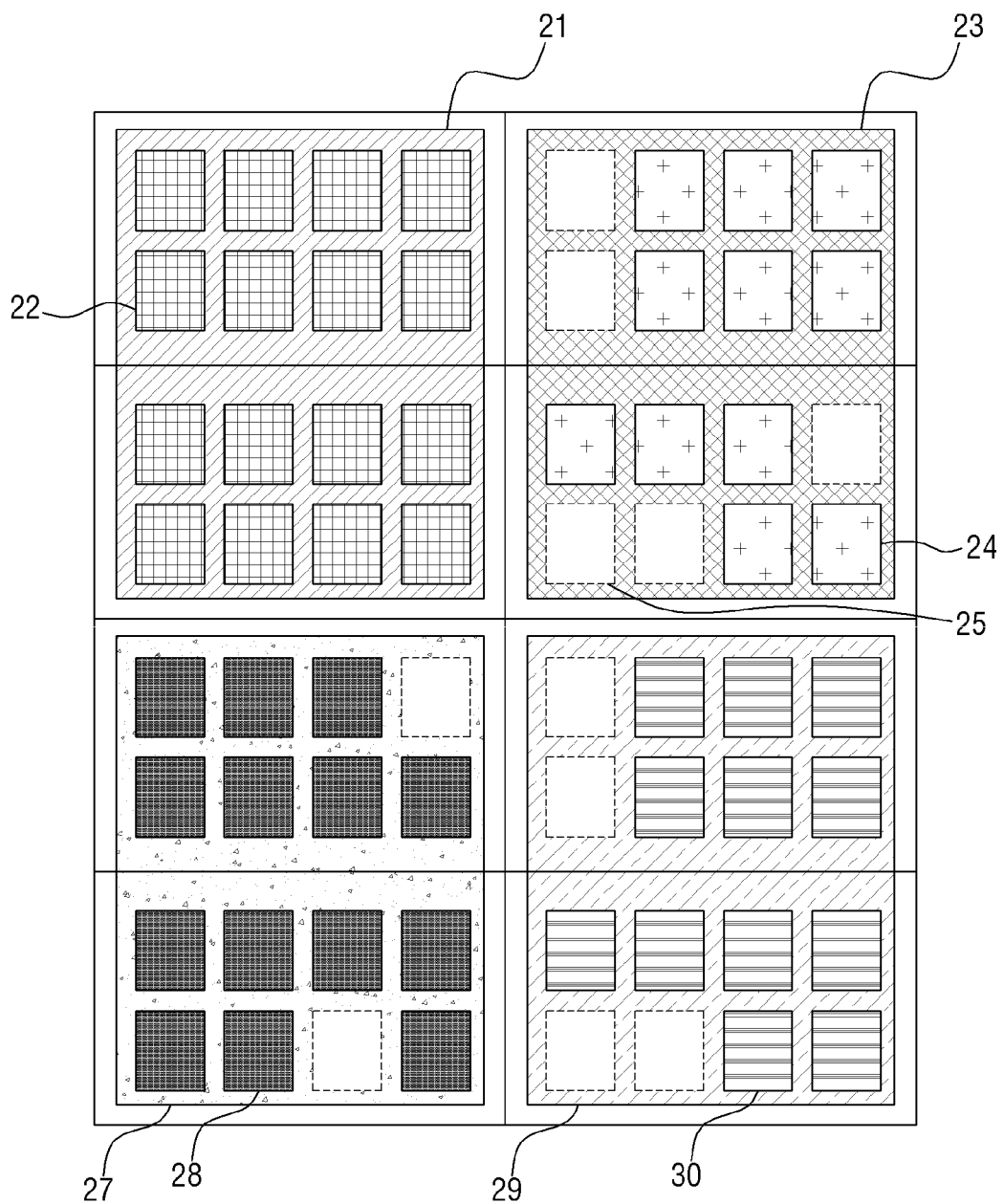
FIGS. 11 and 12 are views for describing a storage area that may be referred to in some embodiments.

For a more detailed description related to the storage area, it will be described with reference to FIG. 11. FIG. 11 is a view for describing a storage area that may be referred to in some embodiments.

Referring to FIG. 11, a storage area partitioned according to attribute information of an object described above is shown. More specifically, the first area 21, in which the first object 22 is stored, the second area 23, in which the second object 24 is stored, the third area 27, in which the third object 28 is stored, and the fourth area 29, in which the fourth object 30 is stored, are shown. In this way, objects having different attributes may be stored in the storage area partitioned according to the attribute information of the object.

In the storage areas described with reference to FIG. 11, four different storage areas are shown, but the present disclosure is not limited to the number of the shown storage areas, and a plurality of storage areas may be included in the present disclosure. It will be described again with reference to FIG. 1.

The object management device 200 may be included in the automated guided vehicle 300 to be described later. More specific operations related to the object management apparatus 100 will be embodied through later descriptions of the specification.

Next, the automated guided vehicle 300 may move in the movable area by receiving the signal transmitted from the automated guided vehicle control device 100. More specifically, the automated guided vehicle 300 may move to sequentially visit only reserved moving nodes so as not to collide with other automated guided vehicles existing in the movable area. In addition, the automated guided vehicle 300 may wait at the current position in order to wait for the moving node to be reserved. In addition, the automated guided vehicle 300 may obtain a new path and move.

In addition, the automated guided vehicle 300 may receive a signal transmitted from the object management device 100 and transport the object loaded in the automated guided vehicle 300. More specifically, the automated guided vehicle 300 may transport the object loaded in the automated guided vehicle 300 to a storage area matching the attribute information of the object. In addition, the automated guided vehicle 300 may transport the objects loaded in the automated guided vehicle 300 to an alternative storage area determined by the alternative criterion.

Finally, the user device 400 may receive and display the movement status information of the automated guided vehicle 300 in the movable area received from the automated guided vehicle control device 100. In addition, the user device 400 may receive and display the status information of the object stored in the storage area received from the object management device 200. The user device 400 may have a web browser or a dedicated application installed to output the movement status information and object status information.

The user device 400 that may be referred to in an embodiment of the present disclosure may be any device as long as it can output the movement status information received from the automated guided vehicle control device 100 and the object status information received from the object management device 200 through a network. For example, the user device 400 that may be referred to in an embodiment of the present disclosure may be any one of a desktop, a workstation, a server, a laptop, a tablet, a smartphone or a phablet, but is not limited thereto, and may be a type of device such as a portable multimedia player (PMP), personal digital assistants (PDA), or E-book reader.

Figure 2:
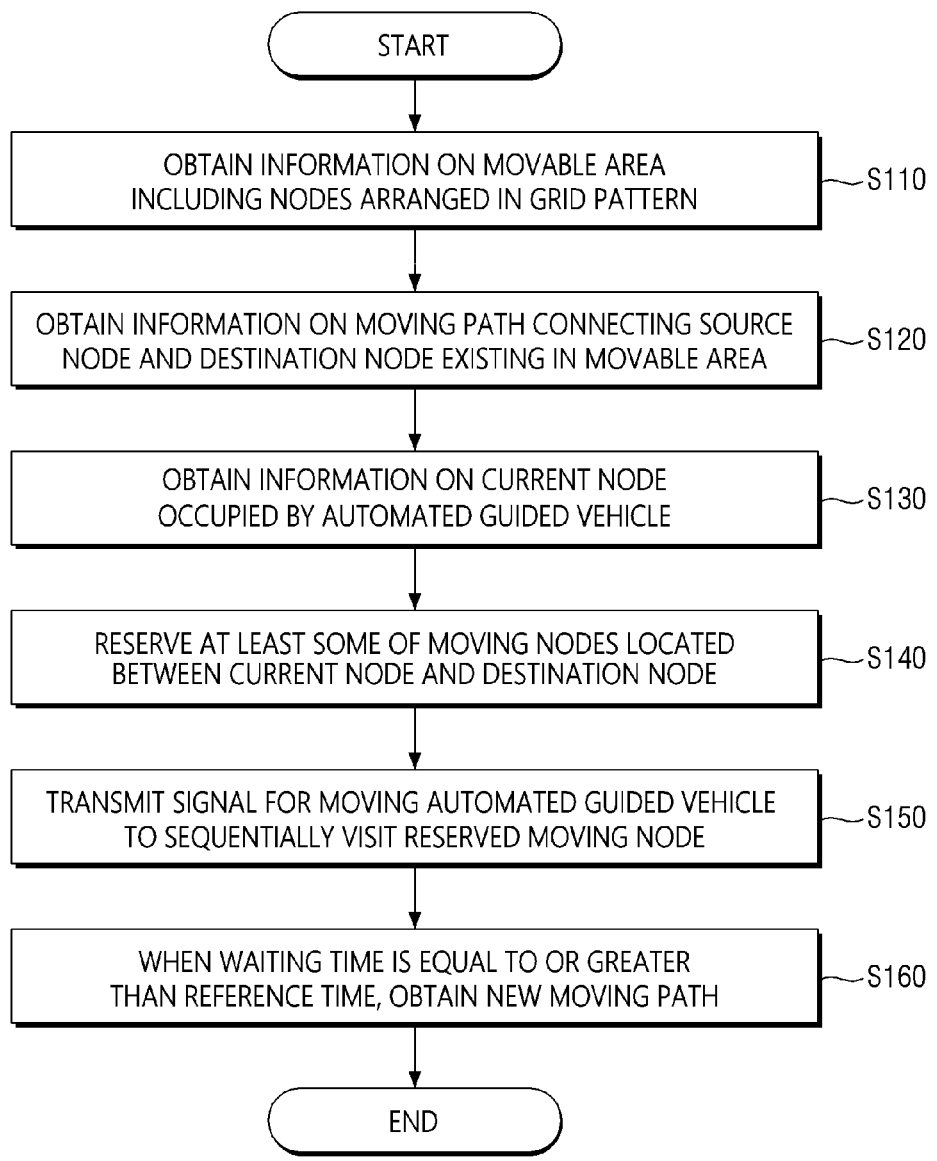
FIG. 2 is a view for describing a method of controlling an automated guided vehicle according to another embodiment of the present disclosure.

Hereinafter, a method for controlling an automated guided vehicle according to another embodiment of the present disclosure will be described with reference to FIG. 2. FIG. 2 is a flowchart of a method for controlling an automated guided vehicle according to another embodiment of the present disclosure.

The method for controlling an automated guided vehicle according to the present embodiment may be performed by a computing device. In addition, the method according to the present embodiment may be performed by being divided by the first computing device and the second computing device. Hereinafter, in performing each operation of the method according to the present embodiment, if the description of the subject is omitted, the subject may be interpreted as being the computing device.

Referring to FIG. 2, in step S110, information on a movable area including nodes arranged in a grid pattern is obtained. As described above with reference to FIGS. 5 to 6, since the movable area includes nodes, the automated guided vehicle can freely move in the movable area.

Next, in step S120, information on a moving path connecting the source node and the destination node existing in the movable area is obtained. In this step, all known algorithms for determining a moving path connecting the source node and the destination node can be applied. For example, a Dijkstra algorithm for connecting a source node and a destination node may be applied. For another example, an A* algorithm for connecting a source node and a destination node may be applied. However, the present disclosure is not limited to this example, and all known algorithms for determining a moving path connecting a source node and a destination node can be applied to the present disclosure.

In some embodiments related to step S120, the first moving path from the first source node of the first automated guided vehicle to the destination node may be searched, and the second moving path from the second source node of the second automated guided vehicle to the destination node may be searched. Individual moving paths existing in the movable area from the source node of each of the plurality of automated guided vehicle to the same destination node may be searched by the above-described path search algorithm.

Here, a moving path composed of a smaller number of moving nodes among the first moving path of the first automated guided vehicle and the second moving path of the second automated guided vehicle may be determined as the shortest moving path. In this case, a signal for moving the shortest path automated guided vehicle that occupies the moving path determined as the shortest moving path may be transmitted to the shortest path automated guided vehicle so that the shortest path automated guided vehicle moves along the shortest moving path.

According to the present embodiment, by using the number of moving nodes included in the moving path, the shortest two-stage path to a specific destination node may be determined from among moving paths of a plurality of automated guided vehicle existing in the movable area. Accordingly, an automated guided vehicle capable of reaching a specific destination node through the shortest two-stage path may be determined. Accordingly, if there is a task to be performed at a specific destination node, an automated guided vehicle capable of performing the task fastest can be determined. Thereby, the efficiency of work using the automated guided vehicle can be improved.

In addition, in some other embodiments related to step S120, when the number of moving nodes constituting the first moving path of the first automated guided vehicle and the number of moving nodes constituting the second moving path of the second automated guided vehicle are the same, the moving path occupied by the automated guided vehicle in moving may be determined as the shortest moving path. According to the present embodiment, since the automated guided vehicle in moving can reach the destination node faster than the stationary automated guided vehicle, if there is a task to be performed at a specific destination node, an automated guided vehicle capable of performing the task fastest can be determined. Thereby, the efficiency of work using the automated guided vehicle can be further improved. In addition, even when the numbers of moving nodes constituting the moving paths of different automated guided vehicles are the same, the shortest path can be more efficiently determined.

In addition, in some other embodiments related to step S120, when the number of moving nodes constituting the first moving path of the first automated guided vehicle and the number of moving nodes constituting the second moving path of the second automated guided vehicle are the same, the moving path occupied by the automated guided vehicle, in which the object is not loaded, may be determined as the shortest moving path. According to this embodiment, since the automated guided vehicle, in which the object is not loaded, can reach the destination node faster than the automated guided vehicle, in which the object is loaded, if there is a task to be performed at a specific destination node, an automated guided vehicle capable of performing the task fastest can be determined. Thereby, the efficiency of work using the automated guided vehicle can be further improved. In addition, even when the numbers of moving nodes constituting the moving paths of different automated guided vehicles are the same, the shortest path can be more efficiently determined.

Next, in step S130, information on the current node occupied by the automated guided vehicle is obtained.

In some embodiments related to step S130, information on the current node may be obtained by identifying an identifier displayed on the node. At this time, the identifier displayed on the node may be photographed by the automated guided vehicle, the identifier may be identified based on the image information transmitted by the automated guided vehicle, and information on the current node occupied by the automated guided vehicle may be obtained as a result of decoding the identifier. In order to obtain information on the current node occupied by the automated guided vehicle, different identifiers may be displayed for each node. According to the present embodiment, by decoding the identifier displayed on the node, it is possible to obtain information on the current node, at which the automated guided vehicle is currently located.

In some other embodiments related to step S130, information on a current node occupied by each of the plurality of automated guided vehicles existing in the movable area may be obtained. For example, information on a first current node occupied by the first automated guided vehicle may be obtained, and information on a second current node occupied by the second automated guided vehicle may be obtained. However, the present disclosure is not limited to two automated guided vehicles as in this example, and information on a current node occupied by a plurality of automated guided vehicles may be obtained.

Next, in step S140, at least some of the moving nodes located between the current node and the destination node are reserved. In this embodiment, the automated guided vehicle is sequentially moved to the reserved moving nodes only when the moving node is reserved. Therefore, if the moving node is not reserved, it waits at the current node. Therefore, by allowing only one automated guided vehicle to reserve a specific node, different automated guided vehicles cannot occupy the same node, and collision of different automated guided vehicles existing in the movable area can be prevented.

Figure 7:
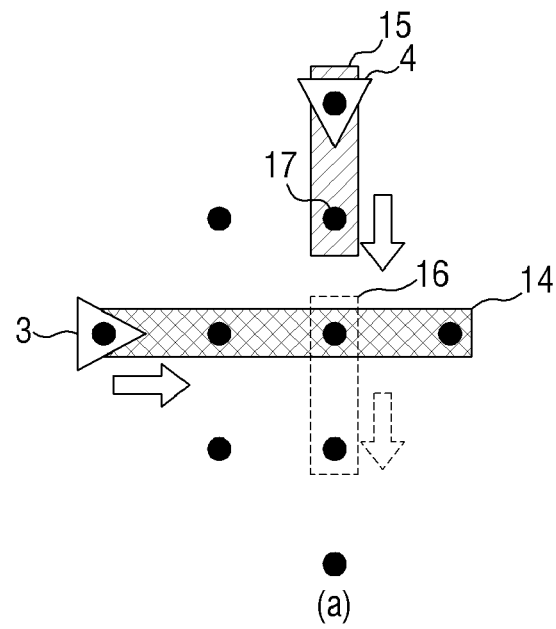
FIG. 7 is a view for describing in more detail some operations of the method for controlling an automated guided vehicle described with reference to FIG. 2.
Figure 7:
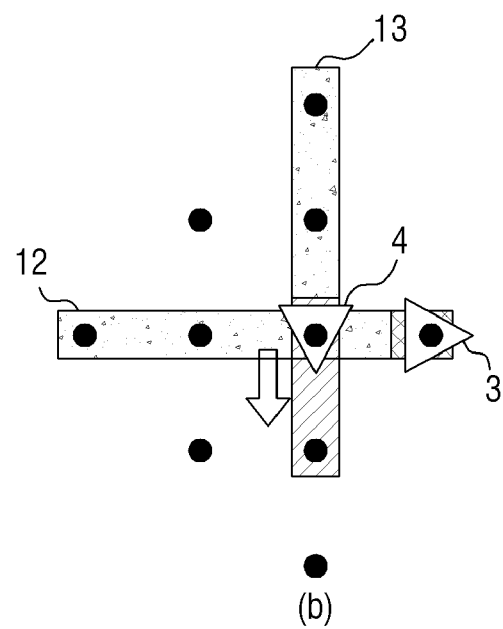

For a more detailed description, it will be described with reference to FIG. 7. FIG. 7 is a view for describing in more detail some operations of the method for controlling the automated guided vehicle described with reference to FIG. 2.

Referring to (a) of FIG. 7, a first reserved path 14 of the first automated guided vehicle 3 and a second reserved path 15 of the second automated guided vehicle 4 are shown. Referring to the second reservation planned path 16 of the second automated guided vehicle 4, there is a node overlapped with the already reserved first reserved path 14. Accordingly, the second automated guided vehicle 4 cannot reserve the overlapped node so that collision with the first automated guided vehicle 3 is prevented. Accordingly, the second automated guided vehicle 4 waits at the waiting place 17, and then can reserve and move the overlapped node only after the first automated guided vehicle 3 passes through the overlapped node.

Referring to (b) of FIG. 7, after the first automated guided vehicle 3 passes through the overlapped node and proceeds along the first moving path 12, the second automated guided vehicle 4 moves along the second moving path 13 and reaches the overlapped node. Accordingly, collision between a plurality of automated guided vehicles existing in the movable area is prevented.

In some embodiments related to step S140, a reference number of moving nodes may be reserved based on the current node occupied by the automated guided vehicle. When all the moving nodes constituting the moving path of the automated guided vehicle are reserved, reservation of other automated guided vehicle existing in the movable area may not be allowed. Accordingly, reservation of other automated guided vehicles is not allowed, and thus movement of other automated guided vehicles may be interfered. In this embodiment, by reserving only a reference number of moving nodes based on the current node occupied by the automated guided vehicle, it is possible to solve the problem of interfering movement of other automated guided vehicles.

Here, the reference number may be a preset value. For example, three moving nodes may be reserved based on the current node. At this time, when the automated guided vehicle moves and the current node currently occupied by the automated guided vehicle is changed, three moving nodes may be reserved again based on the changed current node. However, the reference number is not limited to three as in this example. In addition, the reference number may be set based on the size of the movable area so as not to interfere with the movement of other automated guided vehicles.

In some other embodiments related to step S140, a weight is assigned based on the importance of the automated guided vehicle, and the weight may increase the reference number as the importance increases. According to the present embodiment, the moving nodes constituting the moving path of the automated guided vehicle having high importance are reserved based on the weight, so that the node existing in the movable area can be preempted and reserved. Accordingly, an automated guided vehicle having a high importance can move along a moving path with priority over other automated guided vehicles.

Here, the importance may be determined by the type of the automated guided vehicle. For example, in a system, in which a hierarchy between automated guided vehicles exists, a weight for increasing the reference number of moving nodes that can be reserved according to the grade order of the automated guided vehicles may be assigned. In this case, an automated guided vehicle having a relatively high grade may preempt and reserve a node existing in a movable area than an automated guided vehicle having a relatively low grade.

Also, the importance may be determined by the type of objects loaded by the automated guided vehicle. For example, in a system, in which a hierarchy between objects loaded in an automated guided vehicle exists, a weight for increasing the reference number of moving nodes that can be reserved according to the grade order of objects loaded in the automated guided vehicle may be assigned. In this case, the automated guided vehicle transporting objects with a relatively high grade may preempt and reserve a node existing in the movable area than the automated guided vehicle transporting objects with a relatively low grade.

In some other embodiments related to step S140, when a single path without a detour path is included on the moving path, all moving nodes constituting the single path may be reserved. According to this embodiment, a problem, in which automated guided vehicles entering a single path without a detour path from different directions encounter at any one point on a single path, can be solved. More specifically, all moving nodes constituting a single path are reserved by a specific automated guided vehicle, making it impossible for other automated guided vehicles to reserve, so that a problem, in which different automated guided vehicles encounter each other at any one point on a single path without a detour path, can be solved.

In still other embodiments related to step S140, the first moving path occupied by the first automated guided vehicle moving straight is prioritized over the second moving path occupied by the second automated guided vehicle moving in rotation, and at least some of the moving nodes included in the first moving path may be reserved. According to the present embodiment, the problem of determining the priority of reservations that occurs when reservation planned moving nodes overlap can be solved. Since the automated guided vehicle moving straight moves along the moving path faster than the automated guided vehicle moving in rotation, the priority of reservation may be assigned to the automated guided vehicle moving straight.

Figure 8:
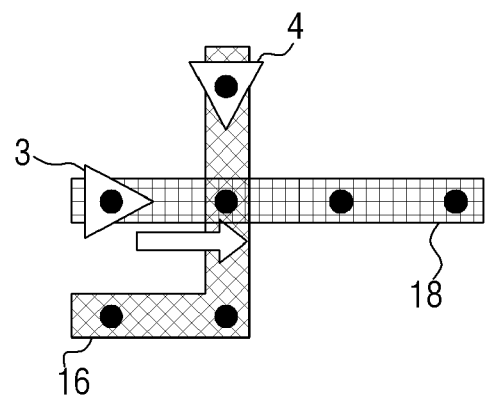
FIGS. 8 and 9 are views for describing in more detail an operation of determining a reservation priority in the method for controlling an automated guided vehicle described with reference to FIG. 2.

For a detailed description related to this, reference will be made to FIG. 8. FIG. 8 is a view for describing in more detail an operation of determining a reservation priority in the method for controlling the automated guided vehicle described with reference to FIG. 2.

Referring to FIG. 8, the first reservation planned path 18 of the first automated guided vehicle 3 and the second reservation planned path 16 of the second automated guided vehicle 4 are shown. The first reservation planned path 18 of the first automated guided vehicle 3 is a straight path, and the second reservation planned path 16 of the second automated guided vehicle 4 is a rotating path. Therefore, as described above, the first reservation planned path 18 of the first automated guided vehicle 3 has priority over the second reservation planned path 16, and the moving nodes constituting the first reservation planned path 18 are reserved with priority. At this time, the second automated guided vehicle 4 reserves the overlapped node and moves along the moving path only after the first automated guided vehicle 3 passes through the overlapped node.

In still other embodiments, the first moving path occupied by the first automated guided vehicle, in which the object is not loaded, is prioritized over the second moving path occupied by the second automated guided vehicle, in which the object is loaded, and at least some of the moving nodes included in the first moving path may be reserved. According to the present embodiment, the problem of determining the priority of reservation that occurs when the reservation planned moving nodes overlap can be solved in a different way. Since the automated guided vehicle, in which the object is not loaded moves along the moving path faster than the automated guided vehicle, in which the object is loaded, the priority of reservation may be assigned to the automated guided vehicle, in which the object is not loaded.

Figure 9:
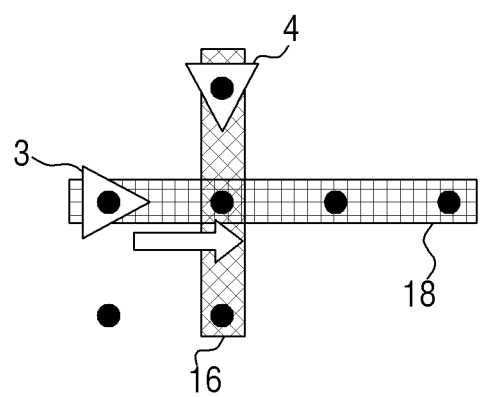

For a detailed description of this, reference will be made to FIG. 9. FIG. 9 is a view for describing in more detail an operation of determining a reservation priority in the method for controlling the automated guided vehicle described with reference to FIG. 2.

Referring to FIG. 9, the first reservation planned path 18 of the first automated guided vehicle 3 and the second reservation planned path 16 of the second automated guided vehicle 4 are shown. The first automated guided vehicle 3 is an automated guided vehicle, in which an object is not loaded, and the second automated guided vehicle 4 is an automated guided vehicle, in which an object is loaded. Therefore, as described above, the first reservation planned path 18 of the first automated guided vehicle 3 has priority over the second reservation planned path 16, and the moving nodes constituting the first reservation planned path 18 are reserved with priority. At this time, the second automated guided vehicle 4 reserves the overlapped node and moves along the moving path only after the first automated guided vehicle 3 passes through the overlapped node.

In some other embodiments, the first moving path occupied by the first automated guided vehicle having a relatively longer waiting time is prioritized over the second moving path occupied by the second automated guided vehicle having a relatively shorter waiting time, and at least some of the moving nodes included on the first moving path may be reserved. According to the present embodiment, the problem of determining the priority of reservation that occurs when the reservation planned moving nodes overlap can be solved in a different way. Since it would be reasonable to move an automated guided vehicle with a relatively longer waiting time before an automated guided vehicle with a relatively shorter waiting time, the priority of reservation may be assigned to an automated guided vehicle with a relatively longer waiting time. It will be described with reference to FIG. 2 again.

Next, a signal for moving the automated guided vehicle to sequentially visit the moving nodes reserved in step S150 is transmitted to the automated guided vehicle. According to the present embodiment, the computing device controls a plurality of automated guided vehicles existing in the movable area, and signals may be transmitted to an automated guided vehicle so that the corresponding automated guided vehicle can be moved. However, the present disclosure is not limited thereto, and an automated guided vehicle may include such a computing device. At this time, the signal may be transmitted to the moving unit of the automated guided vehicle.

In some embodiments related to step S150, the moving speed of the automated guided vehicle, in which the object is loaded, may be set to be lower than the moving speed of the automated guided vehicle, in which the object is not loaded. By adjusting the speed of the automated guided vehicle loading the object, the transported object can be safely moved to the destination node.

Next, in step S160, when the waiting time is greater than or equal to the reference time, a new moving path may be obtained. In obtaining a new moving path, step S120 described above may be referred to. However, a new moving path should be determined by additionally considering information on obstacles causing the waiting of the automated guided vehicle. According to the present embodiment, when the waiting time is greater than or equal to the reference time, it is possible to search for another path and arrive at the destination node faster.

Here, the waiting time may be a preset value. Further, the waiting time may be a value differentially preset according to the type of obstacle.

Figure 10:
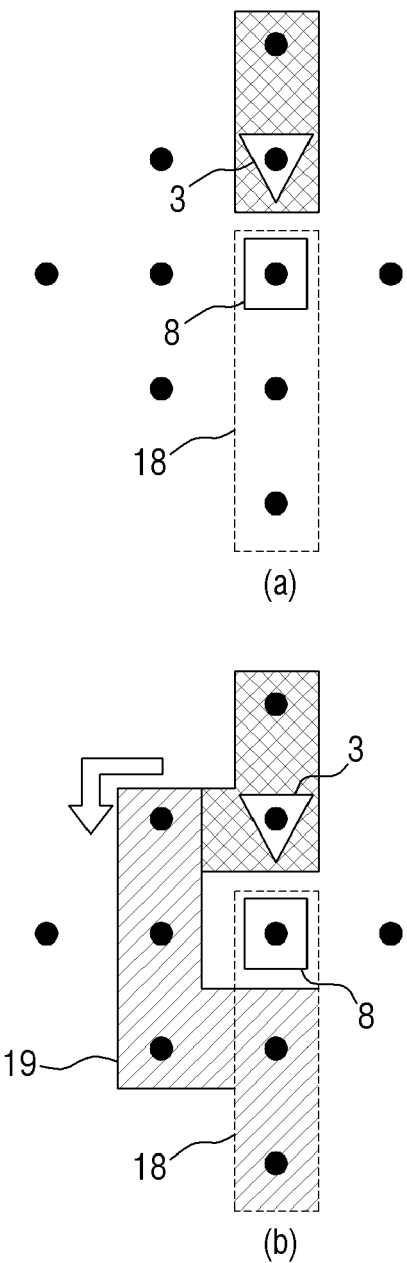
FIG. 10 is a view for describing in more detail an operation of obtaining a new moving path in the method for controlling the automated guided vehicle described with reference to FIG. 2.

For a more detailed description related to this, it will be described with reference to FIG. 10. FIG. 10 is a diagram for describing in more detail an operation of obtaining a new moving path in the method for controlling the automated guided vehicle described with reference to FIG. 2.

Referring to (a) of FIG. 10, an obstacle 8 exists on the first reservation planned path 18 of the first automated guided vehicle 3. Accordingly, the first automated guided vehicle 3 cannot reserve the node where the obstacle 8 is located, and is waiting.

Referring to (b) of FIG. 10, when the waiting time of the first automated guided vehicle 3 is equal to or greater than the reference time, it moves along the new moving path 19 to avoid the obstacle 8.

The method for controlling an automated guided vehicle according to another embodiment of the present disclosure described with reference to FIG. 2 can prevent collisions between a plurality of automated guided vehicles existing in a movable area. Accordingly, the work efficiency of the automated guided vehicle that can freely move on the node including the movable area can be improved.

Figure 3:
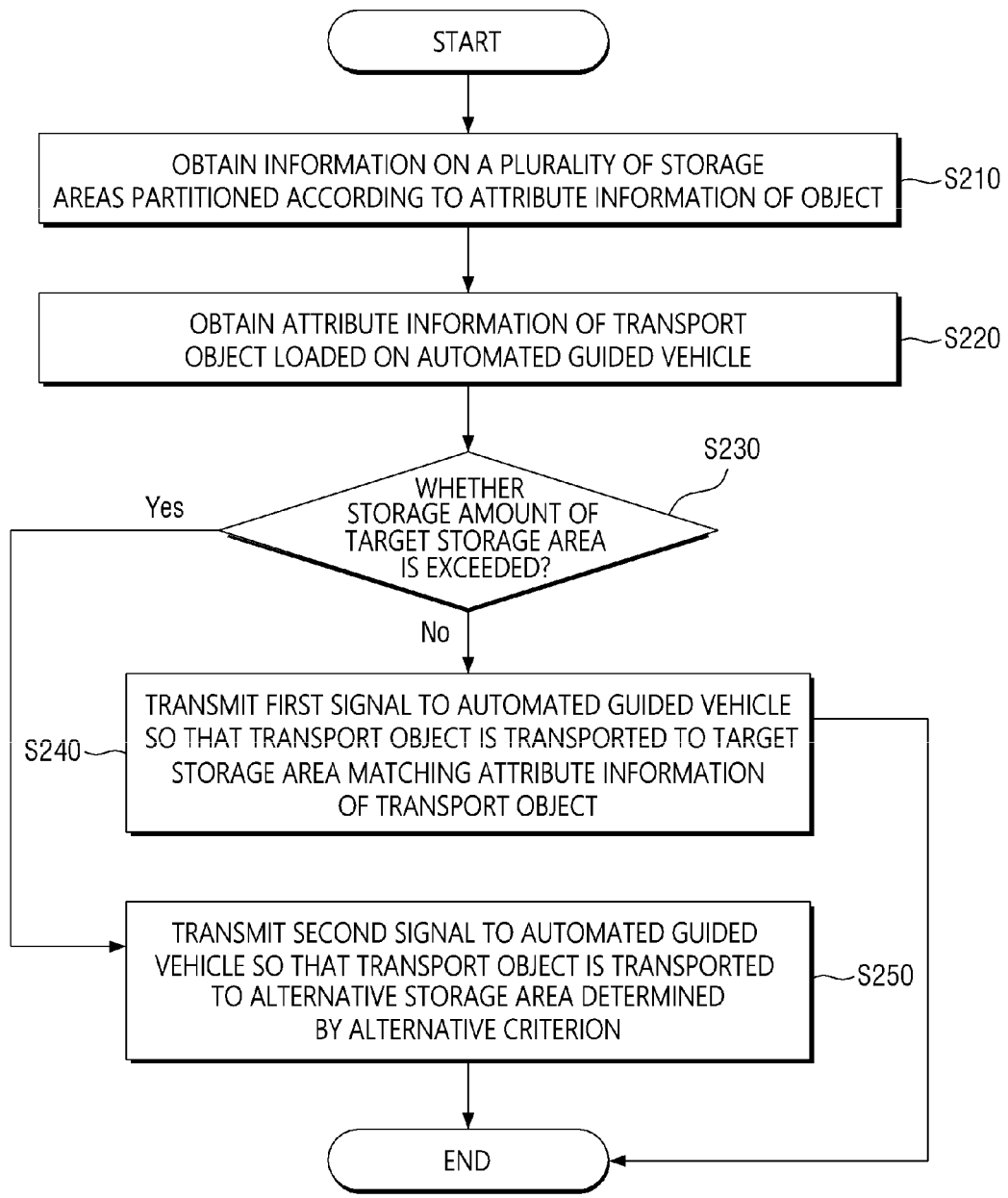
FIG. 3 is a view for describing an object management method according to another embodiment of the present disclosure.

Hereinafter, an object management method according to another embodiment of the present disclosure will be described with reference to FIG. 3. FIG. 3 is a flowchart of an object management method according to another embodiment of the present disclosure.

The object management method according to the present embodiment may be performed by a computing device. In addition, the method according to the present embodiment may be performed by being divided by the first computing device and the second computing device. Hereinafter, in performing each operation of the method according to the present embodiment, if the description of the subject is omitted, the subject may be interpreted as being the computing device.

Referring to FIG. 3, in step S210, information on a plurality of storage areas partitioned according to attribute information of an object is obtained.

Figure 12:
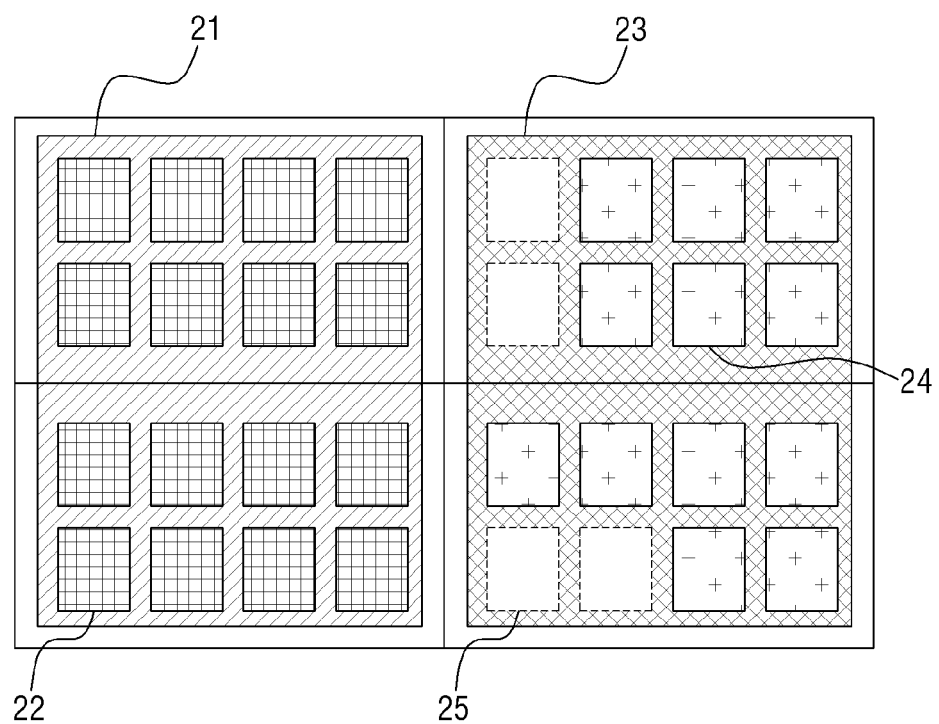

For a detailed description related to this, it will be described with reference to FIG. 12. FIG. 12 is a diagram for describing a storage area that may be referred to in some embodiments.

Referring to FIG. 12, a first object 22 is stored in a first area 21, and a second object 24 is stored in a second area 23. An empty area 25 exists in the second area 23.

Here, a first-level shelf may be located in the empty area 25 to store a second object. In addition, a multi-level shelf may be located in the empty area 25 to store the second object. In this case, the stored second object may be stored by mapping the location of the shelf to be stored, the type of shelf to be stored, and the number of levels of the shelf to be stored in the second area 23.

The present disclosure is not limited to the storage area illustrated with reference to FIG. 12, and a plurality of storage areas partitioned according to attribute information of an object may be all included in the present disclosure.

In some embodiments, the plurality of storage areas may be located on the movable area of the automated guided vehicle described above. Since a plurality of storage areas are located on the movable area, the automated guided vehicle can move and manage objects. According to this embodiment, collisions between a plurality of automated guided vehicles existing in the movable area according to the above-described embodiment are prevented, and the object may be managed in the storage area partitioned based on the attribute of the object in the movable area.

In some other embodiments, a multi-level shelf for storing a small amount of various kinds of materials may be separately provided in addition to the movable area of the automated guided vehicle. In this case, the multi-level shelf may exist in an area other than the movable area of the automated guided vehicle so that the operator can access it at any time. It will be described again with reference to FIG. 3.

Next, in step S220, attribute information of the transport object loaded in the automated guided vehicle is obtained.

In some embodiments related to step S220, the attribute information of the transport object loaded in the automated guided vehicle may be information detected in the loading area of the transport object when the transport object is loaded. For example, if the destination node of the automated guided vehicle is a shelf storing "a" product, an identifier encoded with information about "a" product is displayed on the destination node, and information about "a" product may be obtained by decoding the identifier by the automated guided vehicle.

Also, the attribute information of the transport object may be information detected by the transport object. For example, an identifier, in which information about "a" product is encoded, may be displayed on "a" product loaded by the automated guided vehicle, and information about "a" product may be obtained by decoding the identifier by the automated guided vehicle.

Next, if the storage amount of the target storage area is not exceeded (S230), a first signal is transmitted to the automated guided vehicle so that the transport object is transported to the target storage area matching the attribute information of the transport object in step S240. According to the present embodiment, the transport object may be stored in a target storage area that matches the attribute information of the transport object.

Next, if the storage amount of the target storage area is exceeded (S230), a second signal may be transmitted to the automated guided vehicle so that the transport object is transported to the alternative storage area determined by the alternative criterion in step S250. According to the present embodiment, even if the storage amount of the target storage area matching the attribute information of the transport object is exceeded, a criterion for storing the transport object may be provided. The transport object may be stored in an alternative storage area determined according to the alternative criterion.

Hereinafter, some examples of storing the transport object in another area when the storage amount of the storage area matching the attribute information of the transport object is exceeded will be described with reference to FIGS. 13 and 14.

Figure 13:
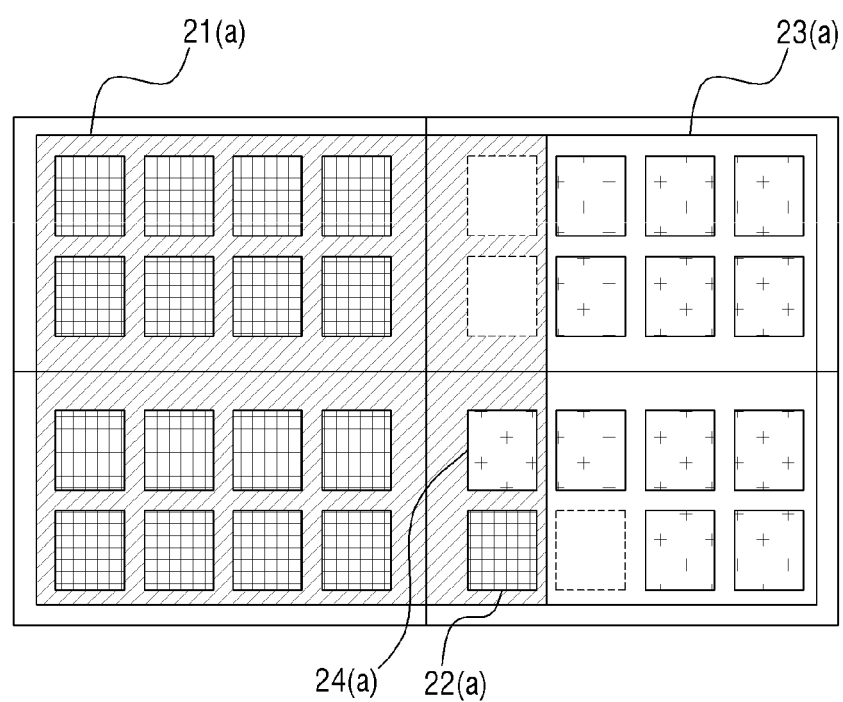
FIG. 13 is a view for describing in more detail an operation of expanding a storage area of the object management method described with reference to FIG. 3.

First, FIG. 13 is a view for describing in more detail an operation of expanding a storage area of the object management method described with reference to FIG. 3. Here, the expansion of the target storage area is shown.

Referring to FIG. 13, an expanded first area 21(a) and a reduced second area 23(a), which are target storage areas, are shown. The same transport object 22(a) as the first object is stored in the expanded first area 21(a). At this time, the second object 24(a) existing in the second area before reduction exists in the first area 21(a) expanded by the expansion of the first area. However, in the present embodiment, the object stored in the storage area is managed by complex mapping of object attribute information and storage location information, so that no problem occurs in management of the second object 24(a). The method of storing the transport object 22(a) described with reference to FIG. 13 is to expand the first area, which is a target storage area that matches the attribute information of the transport object 22(a), so that the transport object 22(a) can be stored.

Figure 14:
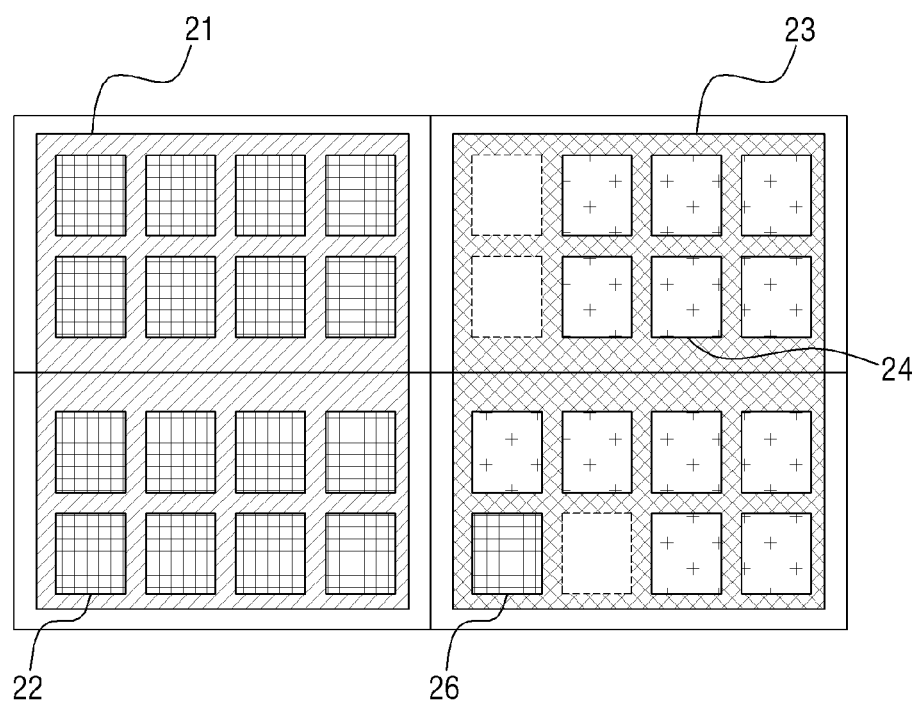
FIG. 14 is a view for describing in more detail an operation of determining an alternative storage area in the object management method described with reference to FIG. 3.

Next, FIG. 14 is a view for describing in more detail an operation of determining an alternative storage area in the object management method described with reference to FIG. 3. Here, the determined alternative storage area is shown.

Referring to FIG. 14, a first area 21 and a second area 23 are shown. Here, the second area 23 is determined as an alternative storage area according to an alternative criterion to be described later, so that the same transport object 26 as the first object 22 is stored in the alternative storage area. The method of storing the transport object 26 described with reference to FIG. 14 stores the transport object 26 in the alternative area according to the alternative criterion, thereby storing the transport object 26 in a storage area more related to the first area 21, which is a target storage area. In this embodiment, the object stored in the storage area is managed by complex mapping of object attribute information and storage location information, so that even if the transport object 26 is stored in the second area 23, which is an alternative storage area, the problem in managing the transport object 26 does not occur.

Hereinafter, the alternative criteria will be described in more detail.

In some embodiments, the alternative criterion may be a criterion for determining the nearest storage area of the target storage area as the alternative storage area. According to the present embodiment, by determining the nearest storage area of the target storage area as an alternative storage area, the convenience of management of managing the same transport object as the object stored in the target storage area can be improved. It is possible to eliminate the waste of the automated guided vehicle moving line, which may occur when the same transport object as the object stored in the target storage area is stored in an excessively distant storage area.

In some other embodiments, the alternative criterion may be a criterion for determining a storage area having the smallest storage rate among a plurality of storage areas as the alternative storage area. According to the present embodiment, the storage area having the smallest storage rate is determined as an alternative storage area, so that a transport object can be stored in a storage area having low operational complexity of the automated guided vehicle. The storage area where the storage rate of the storage area is the lowest is the area, in which the operation complexity of automated guided vehicle is low, and by storing the transport object in this area, the transport object can be managed more efficiently.

In still other embodiments, the alternative criterion may be a criterion for determining the alternative storage area based on a distance between the individual storage area and the target storage area and a storage rate of the individual storage area. According to the present embodiment, a specific storage area is determined as an alternative storage area by considering the combination of the distance between the individual storage area and the target storage area, and the storage rate of the individual storage area, so that a transport object can be managed more efficiently. Different weights are assigned to the distance between the individual storage area and the target storage area and the storage rate of the individual storage area, and they can be used to determine an alternative storage area.

In still other embodiments, the alternative criterion determines the alternative storage area according to a predetermined order, but when the storage rate of the best alternative storage area is greater than or equal to the reference value, the criterion may repeatedly determine an alternative storage area by considering the storage rate of the next alternative storage area according to the order until the storage rate is less than the reference value. According to the present embodiment, based on a predetermined determination order of an alternative storage area, a storage area having a storage rate less than a reference value may be determined as the alternative storage area. This allows more efficient management of the transport object by storing the transport object according to a predetermined order as well as additionally considering the storage rate.

In still another exemplary embodiment, the alternative criterion may be a criterion for determining a storage area storing the similar object determined based on a degree of similarity with attribute information of the transport object as the alternative storage area. Here, the degree of similarity means the degree of similarity between the attribute information of the transport object and the attribute information of a specific object. For example, the type of object may be a criterion for determining the degree of similarity. In this case, the degree of similarity may be determined by the preset similarity group code of the object. For another example, the state of the object may be a criterion for determining the degree of similarity. In this case, the degree of similarity may be determined depending on whether the state of the object is the same state or adjacent state. For another example, the type of the object and the state of the object may all be considered. In this case, the degree of similarity may be determined by assigning different weights to the type of the object and the state of the object, respectively. According to the present embodiment, by determining the storage area, in which similar objects similar to the transport object are stored, as an alternative storage area, it is possible to more efficiently manage the transport object.

The object management method according to another embodiment of the present disclosure described with reference to FIG. 3 may more efficiently manage an object stored in a storage area divided according to attribute information of an object. In particular, even when the storage amount of a specific storage area is exceeded, objects can be managed more efficiently by storing objects in other storage areas according to clear criteria.

So far, with reference to FIGS. 1 to 2 and 4 to 10, a method for controlling an automated guided vehicle according to an embodiment of the present disclosure and its application fields have been described. In addition, an object management method according to another embodiment of the present disclosure and its application fields have been described with reference to FIGS. 1, 3 and 11 to 14.

Hereinafter, an exemplary computing device 1500 that can implement an apparatus and a system, according to various embodiments of the present disclosure will be described with reference to FIG. 15.

Figure 15:
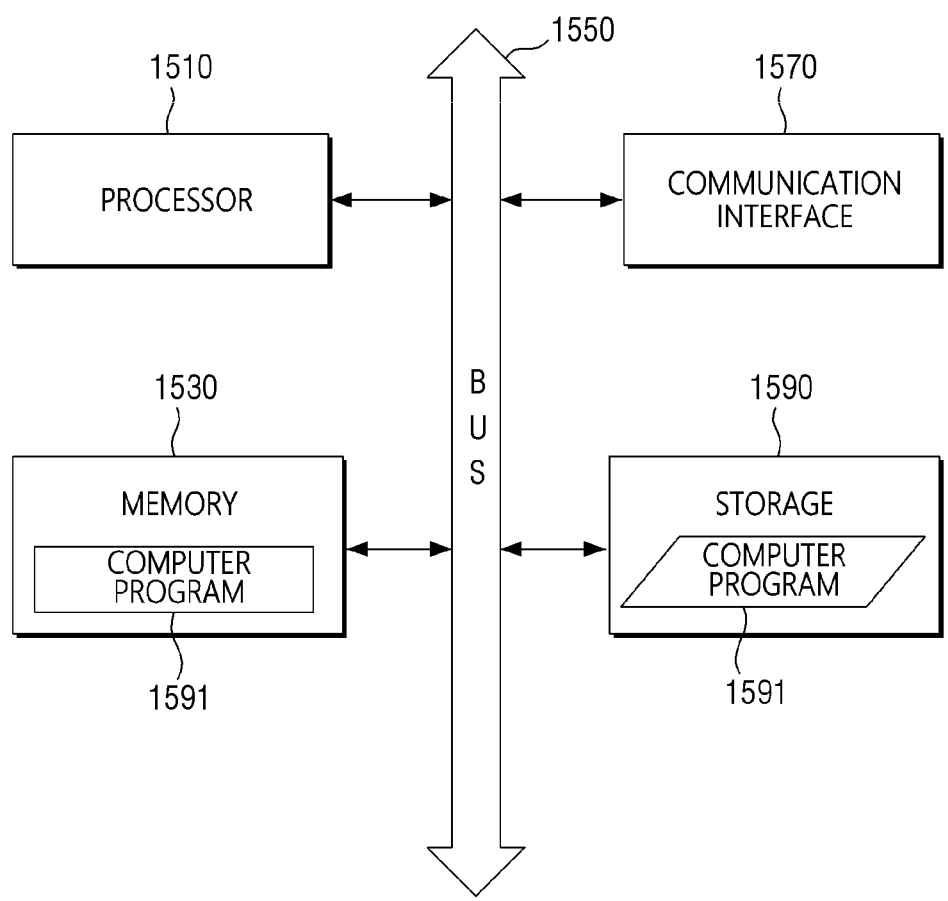
FIG. 15 is a hardware configuration diagram of an automated guided vehicle according to another embodiment of the present disclosure.

FIG. 15 is an example hardware diagram illustrating a computing device 1500.

As shown in FIG. 15, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 15 illustrates only the components related to the embodiment of the present disclosure. Therefore, it will be appreciated by those skilled in the art that the present disclosure may further include other general purpose components in addition to the components shown in FIG. 15.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure. For example, when the computer program 1591 is loaded into the memory 1530, the logic (or the module) as shown in FIG. 2 may be implemented on the memory 1530. An example of the memory 1530 may be a RAM, but is not limited thereto.

The bus 1550 provides communication between components of the computing device 1500. The bus 1550 may be implemented as various types of bus such as an address bus, a data bus and a control bus.

The communication interface 1570 supports wired and wireless internet communication of the computing device 1500. The communication interface 1570 may support various communication methods other than internet communication. To this end, the communication interface 1570 may be configured to comprise a communication module well known in the art of the present disclosure.

The storage 1590 can non-temporarily store one or more computer programs 1591. The storage 1590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as interne and installed in the other computing device, thereby being used in the other computing device.

Although the operations are shown in a specific order in the drawings, those skilled in the art will appreciate that many variations and modifications can be made to the preferred embodiments without substantially departing from the principles of the present disclosure. Therefore, the disclosed preferred embodiments of the invention are used in a generic and descriptive sense only and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method performed by a computing device for controlling an automated guided vehicle, the method comprising:
   obtaining information on a movable area including nodes arranged in a grid pattern;
   obtaining information on a moving path connecting a source node and a destination node existing in the movable area, wherein the moving path includes a plurality of moving nodes;
   reserving at least one of the moving nodes located between a current node and the destination node by using information on the current node occupied by the automated guided vehicle according to movement of the automated guided vehicle; and
   transmitting a signal for moving the automated guided vehicle to the automated guided vehicle to sequentially visit the reserved at least one of the moving nodes,
   wherein the automated guided vehicle comprises a first automated guided vehicle and a second automated guided vehicle,
   wherein the obtaining of the information on the moving path comprises:
   searching for a first moving path from a first source node of the first automated guided vehicle to the destination node;
   searching for a second moving path from a second source node of the second automated guided vehicle to the destination node; and
   determining a moving path including a smaller number of moving nodes among the first moving path and the second moving path as a shortest moving path, and
   wherein the determining of the moving path further comprises:
   when the number of moving nodes included in the first moving path and the number of moving nodes included in the second moving path are the same, determining which one of the first and second automated guided vehicles can reach the destination node faster; and
   determining the moving path of the one of the first and second automated guided vehicles which can reach the destination node faster as the shortest moving path.

2. The method of claim 1, wherein
   when the moving paths of the first automated guided vehicle and the second automated guided vehicle have at least one node in common, only one of the moving paths of the first automated guided vehicle and the second automated guided vehicle is reserved.

3. The method of claim 1, further comprising:
   transmitting a signal for moving either the first automated guided vehicle or the second automated guided vehicle having the shortest moving path to move said either the first automated guided vehicle or the second automated guided vehicle along the shortest moving path.

4. The method of claim 1, wherein the determining which one of the first and second automated guided vehicles can reach the destination node faster comprises:
   determining a moving path occupied by the one of the first and second automated guided vehicle which is in moving as the shortest moving path.

5. The method of claim 1, wherein the determining which one of the first and second automated guided vehicles can reach the destination node faster comprises:
   determining a moving path occupied by one of the first and second automated guided vehicles which is not loaded with an object as the shortest moving path.

6. The method of claim 1, wherein the reserving of the at least one of the moving nodes comprises:
   identifying an identifier displayed on the current node to obtain information on the current node.

7. The method of claim 1, wherein the reserving of the at least one of the moving nodes comprises:
   reserving a reference number of moving nodes based on the current node.

8. The method of claim 7, wherein the reserving of the reference number comprises:
   assigning a weight based on an importance of the automated guided vehicle, wherein the weight increases the reference number as the importance increases.

9. The method of claim 7, wherein the reserving of the reference number of moving nodes comprises:
   reserving, if a single path without a detour path is included on the moving path, all moving nodes included in the single path.

10. The method of claim 1, wherein
    the reserving of at least one of the moving nodes comprises:
    reserving at least one of moving nodes included on the first moving path of the first automated guided vehicle with priority over the second moving path of the second automated guided vehicle, wherein the first moving path is occupied by the first automated guided vehicle moving straight and the second moving path is occupied by the second automated guided vehicle moving in rotation.

11. The method of claim 1, wherein
    the reserving of the at least one of the moving nodes comprises:
    reserving at least one of moving nodes included on the first moving path of the first automated guided vehicle with priority over the second moving path of the second automated guided vehicle, wherein the first moving path is occupied by the first automated guided vehicle not loaded with an object and the second moving path occupied by the second automated guided vehicle loaded with an object.

12. The method of claim 1, wherein
    the reserving of the at least one of the moving nodes comprises:
    reserving at least one of moving nodes included on the first moving path of the first automated guided vehicle with priority over the second moving path of the second automated guided vehicle, wherein the first moving path is occupied by the first automated guided vehicle having a relatively longer waiting time and the second moving path is occupied by the second automated guided vehicle having a relatively shorter waiting time.

13. An automated guided vehicle comprising:
a processor;
a network interface;
a memory; and
a computer program loaded into the memory and executed by the processor,
wherein the computer program comprises:
an instruction for obtaining information on a movable area including nodes arranged in a grid pattern;
an instruction for obtaining information on a moving path connecting a source node and a destination node existing in the movable area, wherein the moving path includes a plurality of moving nodes;
an instruction for reserving at least one of the moving nodes located between a current node and the destination node by using information on the current node occupied by the automated guided vehicle according to movement of the automated guided vehicle; and
an instruction for transmitting a signal for moving the automated guided vehicle to the automated guided vehicle to sequentially visit the reserved at least one of the moving nodes,
wherein the automated guided vehicle comprises a first automated guided vehicle and a second automated guided vehicle,
wherein the instruction for obtaining of the information on the moving path comprises:
an instruction for searching for a first moving path from a first source node of the first automated guided vehicle to the destination node;
an instruction for searching for a second moving path from a second source node of the second automated guided vehicle to the destination node; and
an instruction for determining a moving path including a smaller number of moving nodes among the first moving path and the second moving path as a shortest moving path, and
wherein the instruction for determining of the moving path further comprises:
an instruction for, when the number of moving nodes included in the first moving path and the number of moving nodes included in the second moving path are the same, determining which one of the first and second automated guided vehicles can reach the destination node faster; and
an instruction for determining the moving path of the one of the first and second automated guided vehicles which can reach the destination node faster as the shortest moving path.

* * * * *